US005623663A

United States Patent [19]
Morgan et al.

[11] Patent Number: 5,623,663
[45] Date of Patent: Apr. 22, 1997

[54] CONVERTING A WINDOWING OPERATING SYSTEM MESSAGING INTERFACE TO APPLICATION PROGRAMMING INTERFACES

[75] Inventors: Scott A. Morgan, Travis County; Karl D. Johnson, Williamson County; Judith H. Lewis, Travis County, all of Tex.

[73] Assignee: International Business Machines Corp., Armonk, N.Y.

[21] Appl. No.: 337,705

[22] Filed: Nov. 14, 1994

[51] Int. Cl.$^6$ .................................................. G06F 17/00
[52] U.S. Cl. .................. 395/650; 395/701; 395/500; 364/DIG. 1; 364/239.9; 364/DIG. 2; 364/927.92; 364/977.1
[58] Field of Search ................ 395/156, 200.01, 395/500, 700, 650, 800, 13, 575, 725, 200.2

[56] References Cited

U.S. PATENT DOCUMENTS

| | | | |
|---|---|---|---|
| 4,870,561 | 9/1989 | Love et al. | 364/192 |
| 5,083,262 | 1/1992 | Haff, Jr. | 395/500 |
| 5,097,533 | 3/1992 | Burger et al. | 395/500 |
| 5,113,393 | 5/1992 | Kam et al. | 370/94.1 |
| 5,187,782 | 2/1993 | Skeen et al. | 395/600 |
| 5,226,160 | 7/1993 | Waldron et al. | 395/650 |
| 5,313,581 | 5/1994 | Giokas et al. | 395/700 |
| 5,317,688 | 5/1994 | Watson et al. | 395/161 |
| 5,379,432 | 1/1995 | Orton et al. | 395/700 |
| 5,404,529 | 4/1995 | Chernikoff et al. | 395/700 |

FOREIGN PATENT DOCUMENTS

0567699A1  4/1992  European Pat. Off. .

OTHER PUBLICATIONS

Caster; "A Grand Tour of Windows NT: Portable 32-bit multiprocessing comes to Windows" *Microsoft System Journal* Aug. 1992 (text only).

Schmitt; "The Flexible Interface;" *PC Tech Journal* Nov. 1987.

Pietrelz; "Investigating the Hybrid Windowing & Messaging Architecture of Chicago"; *Microsoft System Journal* Sep. 1994.

*Primary Examiner*—Larry D. Donaghue
*Attorney, Agent, or Firm*—Whitham, Curtis, Whitham & McGinn; Jeffrey S. LaBaw

[57] ABSTRACT

A message-driven application is converted to an Application Programming Interface-driven application while retaining the same functionality in a windowing graphical user interface that is inherently message-driven. At minimal application coding expense, an application that send messages to control its windows can be converted such that APIs are called instead to perform the exact same result.

9 Claims, 6 Drawing Sheets

CONVERTING A WINDOWING OPERATING SYSTEM MESSAGING INTERFACE TO APPLICATION PROGRAMMING INTERFACES

BACKGROUND OF THE INVENTION

1. Field of the Invention

The present invention generally relates to the messaging interface between a computer application program and a windowing operating system and, more particularly, to a method and architecture for taking an existing application program that is totally message driven and converting it such that the need for messages on a lower priority thread is avoided.

2. Description of the Prior Art

The invention is described in terms of the International Business Machines (IBM) Corporation 32-bit windowing operating system (OS) for microcomputers known as OS/2. The windowing user interface for OS/2 is the Presentation Manager (PM). The architecture of an OS/2 PM application is based on a messaging interface. Messages are sent to windows of the application and are processed in a message procedure for that window. Each class of windows has its own unique message procedure to process messages in order to perform its intended function.

Many applications need to perform some processing on background, or worker, threads. The intent is that work performed on these background threads should be done at a lower system priority than work performed on the main user interface thread. The main thread should be free to respond immediately to any requests generated by the user interacting with the windows on the screen.

A problem exists when the background thread also needs to communicate with the windows. Since the PM realizes the need for the user interface thread to have the highest priority on the central processing unit (CPU), the PM raises the priority of any thread that sends messages to a PM window to be equal to that of the main user interface thread. For a background, low priority thread, this means that when it sends a message to a window, its priority is raised such that it is no longer executing in the background. This defeats the purpose of having a background thread at all, and it significantly decreases the performance of the main user interface thread as perceived by the user.

Since most functions that need to be performed on the background thread simply need to communicate with the window in order to get or set internal data, rather than actually interacting with the windows themselves, the raising of the background thread's priority is not desired. Without the messages from the background thread, the PM will not raise that thread's priority, and the processing will continue at the desired low priority and not impact the performance of the main user interface thread.

SUMMARY OF THE INVENTION

It is therefore an object of the present invention to provide a method and architecture for allowing an existing application program to avoid using a messaging interface for those times on a background thread when it is not necessary, thus keeping the background thread at the desired low priority.

According to the invention, there is provided a method by which an application can convert a message driven application interface to an application programming interface (API) in the control of an application's graphical user interface. At minimal application coding expense, an application that sends messages to control its windows can be converted such that APIs are called instead to perform the exact same result. This is accomplished by setting up an internal array matching specific messages to the specific object classes that support them, containing the address of the particular function that supports that message for that class. This invention prevents performance degradation in a multi-thread environment when the application is interacting with its windows from a background low-priority thread.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
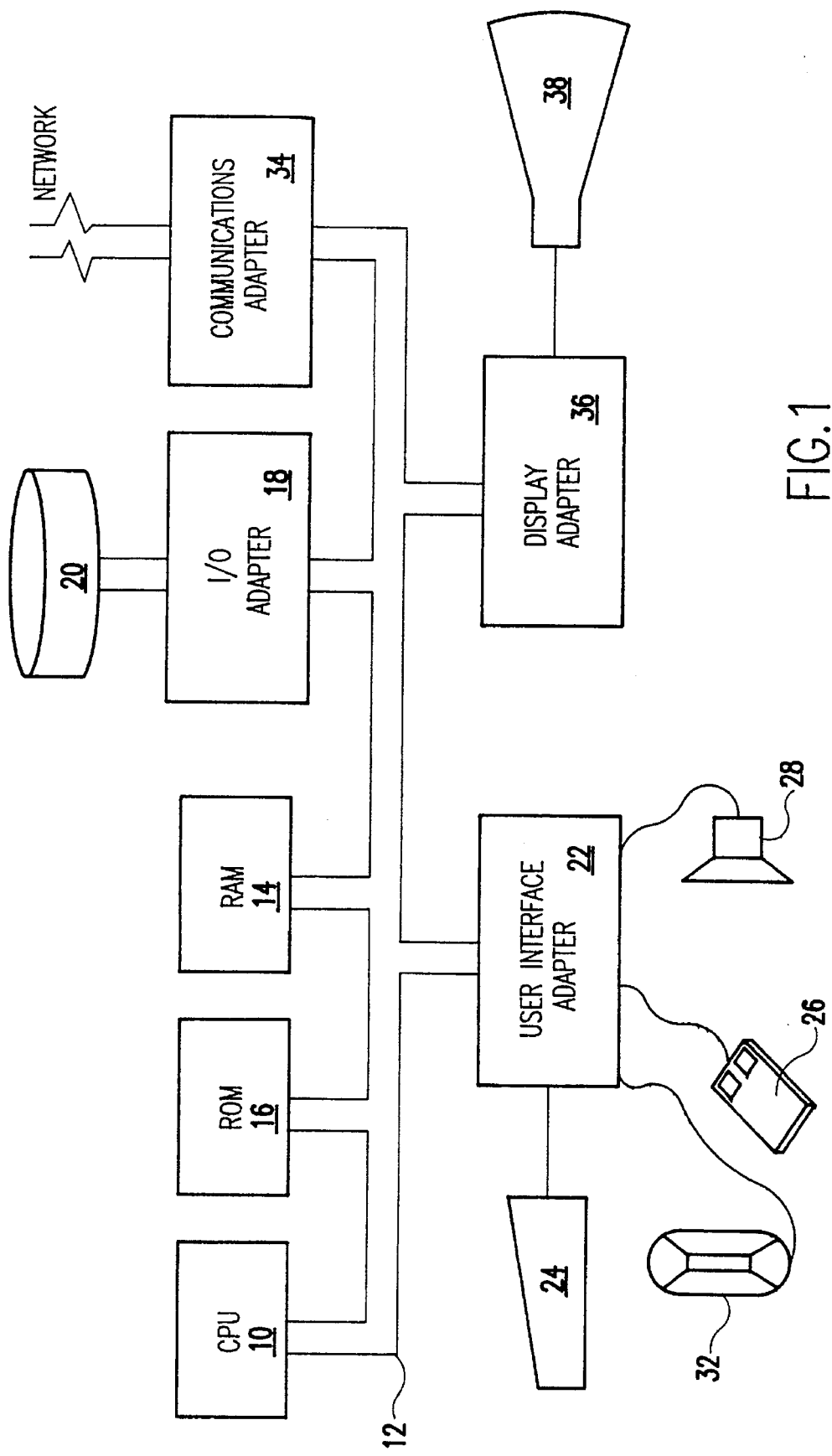
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a personal computer such as the International Business Machines (IBM) Corporation's PS/2 Personal Computers or a workstation such as IBM's RS/6000 Workstations. The hardware includes a central processing unit (CPU) 10, which may be a complex instruction set computer (CISC) microprocessor such as the Intel 386, 486 or Pentium microprocessors or a reduced instruction set computer (RISC) microprocessor such as IBM's PowerPC microprocessor. The CPU 10 is attached to a system bus 12 to which are attached a random access memory (RAM) 14, a read only memory (ROM) 16, an input/output (I/O) adapter 18, and a user interface adapter 22. The RAM 14 provides temporary storage for application program code and data, while ROM 16 typically includes the basic input/output system (BIOS) code. The I/O adapter 18 is connected to one or more Direct Access Storage Devices (DASDs), here represented as a disk drive 20. The disk drive 20 typically stores the computer's operating system (OS) and various application programs, each of which are selectively loaded into RAM 14 via the system bus 12. In the case of a personal computer system, the I/O adapter 18 may support, for example, the Integrated Device Electronics (IDE) interface standard or the Small Computer System Interface (SCSI) standard. In the former case, the I/O adapter 18 typically will support two disk drives in parallel, designated as drives "C:" and "D:". In the latter case, the I/O adapter 18 will support up to seven disk drives, compact disk (CD) ROM drives or other peripherals or a combination thereof connected in a daisy chain. The user interface adapter 22 has attached to it a keyboard 24, a mouse 26, a speaker 28, a microphone 32, and/or other user interface devices such as a touch screen device (not shown). Such touch screen device would optionally be installed on the display 38, here represented as a cathode ray tube (CRT) display but which may be a liquid crystal display (LCD). The display 38 is connected to the system bus 12 via a display adapter 34. A communications adapter 34 is connected to the bus 12 and to a local area network (LAN), such as IBM's Token Ring LAN.

Figure 2:
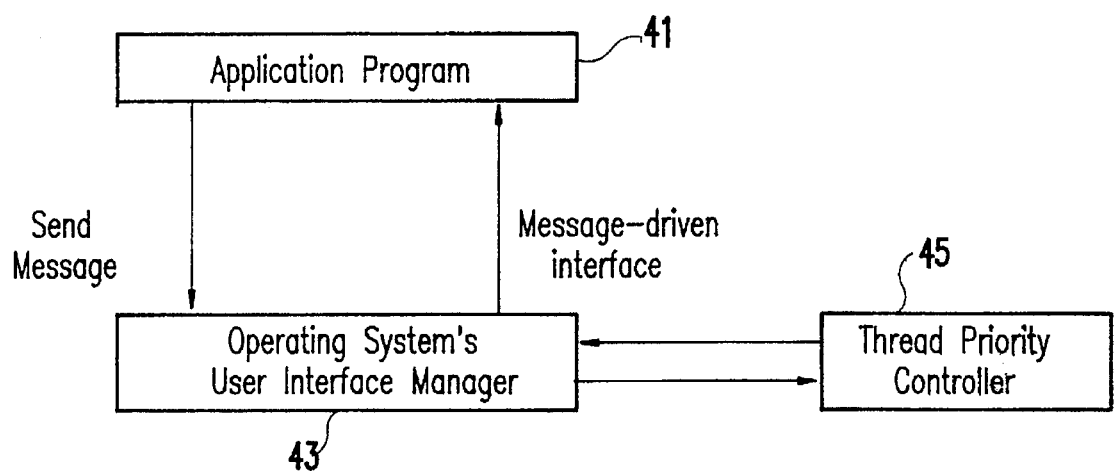
FIG. 2 is a functional block diagram showing the data flow of the main user interface thread as it is known in the prior art.

FIG. 2 shows the data flow of the main user interface thread as it is known in the prior art. This is a foreground, high priority process. A message is sent from the application program 41 to the operating system 43. Upon receiving the message, the operating system 43 invokes the thread priority controller 45 and boosts the priority of that thread, thinking it must be the primary user interface thread since a message was sent. Then the operating system 43 sends the message on to the application's message-handling procedure.

Figure 3:
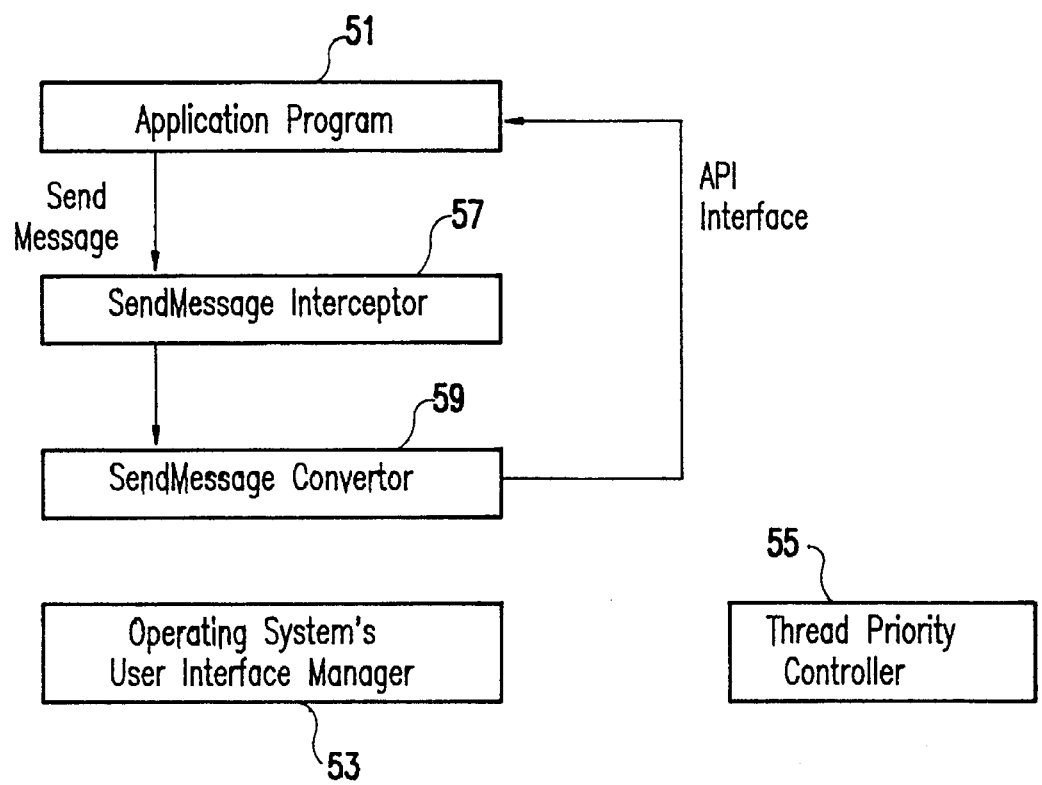
FIG. 3 is a functional block diagram showing the data flow of the background thread according to invention.

In FIG. 3, the procedure according to the invention maintains the background thread at a low priority. The invention inserts code that intercepts the send message call from the application program 51 to the operating system 53. The SendMessage intercepter 57 intercepts the message call and passes to it to the SendMessage converter 59 which converts the message call into an API (function) call instead. The operating system 53 never knows about the message, and the thread priority controller 55 is never invoked to boost the thread's priority above that of a normal non-user-interface background thread.

The solution to the problem according to the invention is achieved by modifying the application's architecture such that the background thread can use application program interfaces (APIs) rather than messages to exchange data with its windows. An application that is already written to use messages would want this change to require the bare minimum of code modification.

The first step the application needs to perform is to move its processing of each message from within the message procedure into separate functions. When the message is received, it should now call the function and return what the function returns rather than processing it with in-line code.

An array is declared that equates class and message to the address of the function that class would call for that message. Since these function addresses cannot change at runtime, this array can be declared globally and filled in at compile time rather than resolved at runtime.

The array is a two-dimensional array. One dimension is for the message numbers that are supported by the new API, and the other dimension is for the class names of the windows that are supported. The actual entries in the array are the address of the function that should be called for the message when sent to that class of window. Any combination of class and message that is not supported by the new API would leave its array entry set to NULL.

To eliminate the need for the application to examine its code and change the send message call currently used to instead call the new API in each instance that the new API is supported, a new macro is defined. This macro redefines the send message call to always call the new API, for those instances where the class and message are supported by the new API and for those instances when it is not. The new API therefore needs to receive the exact same parameters as did the send message call.

The four basic parameters to a PM send message are the handle of the window to which the message is being sent, the message number, and two 32-bit parameters that are message specific. Since each window is of a specific class, and each class has its own message procedure, the proper function to call can be obtained from the passed parameters.

When the application code reaches that point where it previously called to send a message, via the macro it will now call the new API instead. The processing with the new API will perform a check to see if the class and message are supported. If so, the appropriate function will be called to process the message without actually sending the message to the window. If not supported by the API, the send message call will be made, passing the parameters through to the PM exactly as if the application had called it directly. In this manner all send message calls can be routed through this new API, with those supported reaping the benefits of not actually sending a message to perform the work, while those not supported can be passed through as messages exactly as they were before.

Figure 4A:
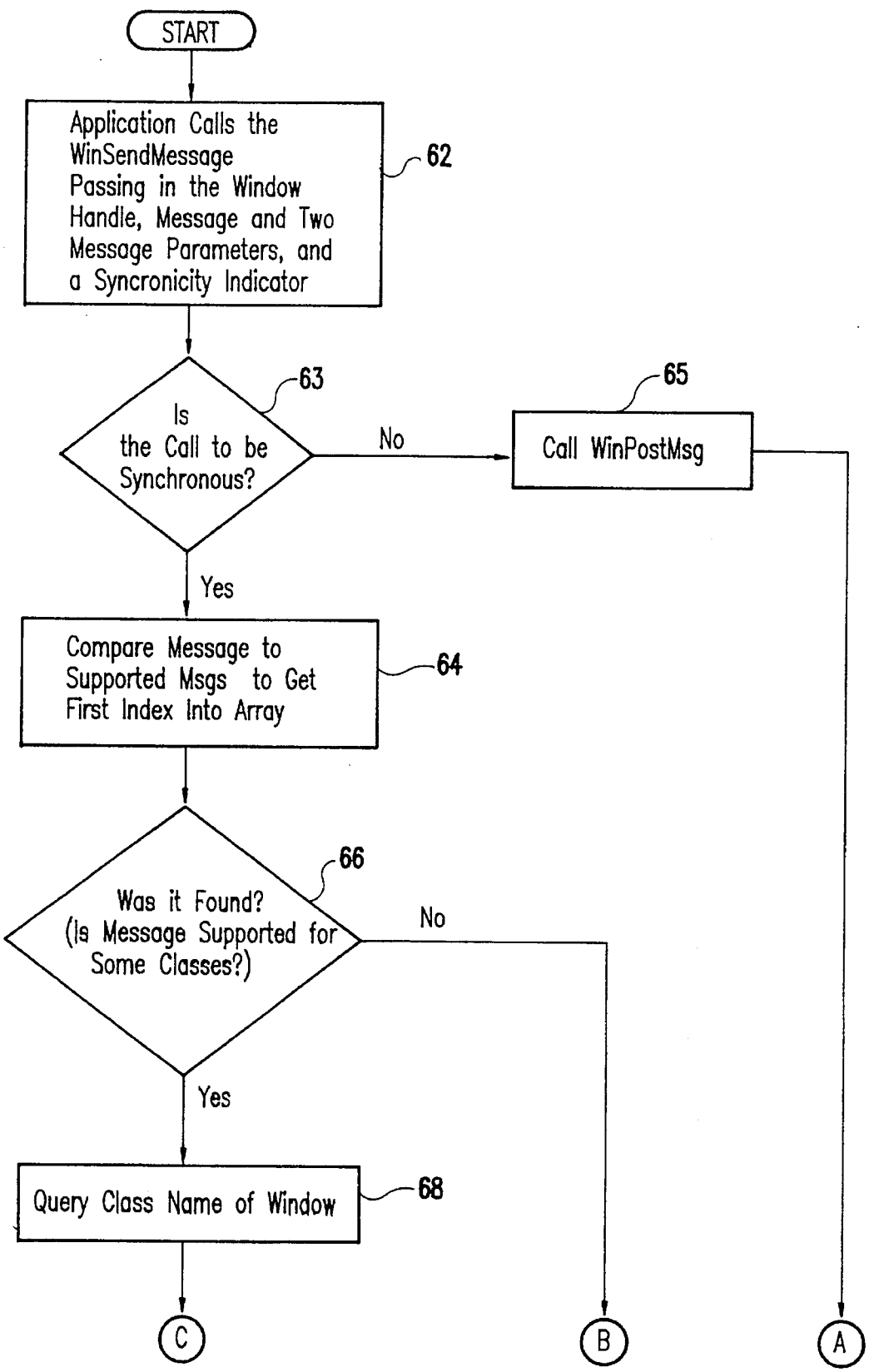
FIGS. 4A and 4B, taken together, are a flow diagram of the process of a first embodiment of the present invention.
Figure 4B:
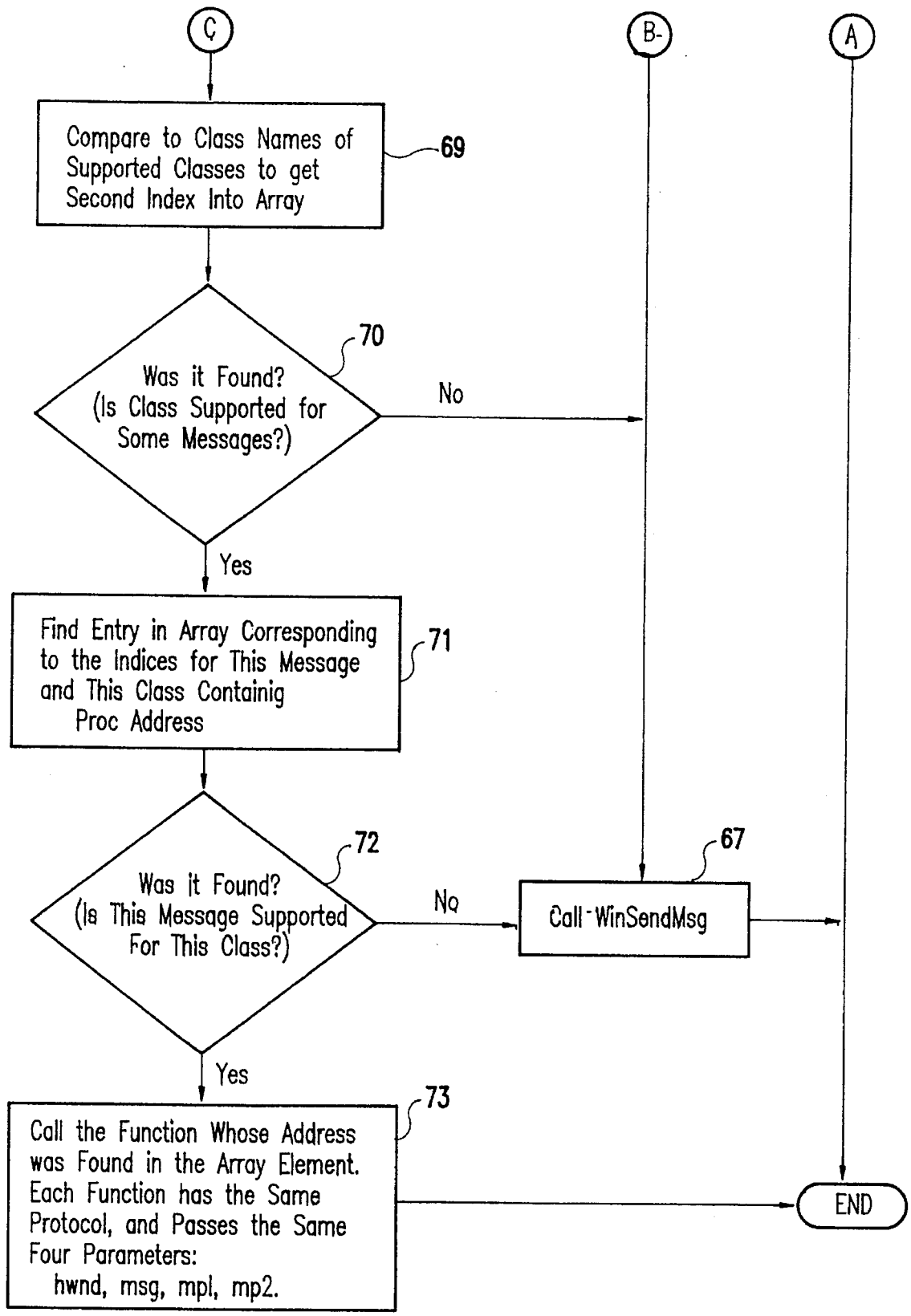

With reference now to the flow chart of FIGS. 4A and 4B, the actual processing within the API should be performance oriented as well. First, the application calls the WinSendMessage in function block 62, passing in the window handle, message and two message parameters, and synchronicity indicator. In decision block 63, a test is made to determine if the message is one of those that the API supports and if the call is synchronous. If the call is not synchronous, WinPostMessage is called in function block 65 and the process ends. This is done with a C-language case statement. If the message is supported, then the index into the array for that message is accessed in function block 64. A test is next made in decision block 70 to determine if the class of the window to which the message is directed is supported by the API. The class name is obtained by calling the WinQueryClassName call. The returned class name string is then compared to the class name strings of supported classes. If the class is not supported, then WinSendMessage is called in function block 67 and the process ends. If a match is found, the other index into the array is accessed in function block 69.

The API will now have the two-level index into the array and can retrieve the function address in function block 71. A test is next made in decision block 70 to determine if the class is supported for some messages. If not, WinSendMessage is called in function block 67 and the process ends. The function address may be NULL, however, if this particular supported class does not support this particularly supported message. If the class is supported, the entry in the array corresponding to the indices for this message and this class are found in function block 71. The function can be called directly, passing the same four parameters that would have been received by it in the message procedure itself. Again, a test is made in decision block 72 to determine if an array entry was found. If no entry corresponding to the indices for the message and class is found, then WinSendMessage is called in function block 67 and the process ends. Otherwise, the function whose address was found in the array element is called in function block 73. Each function has the same protocol, and passes the same four parameters (hwnd, msg, mp1, and mp2). Then the process ends.

If at any step in the processing of the API it is found that the API does not support this combination of class and message, the send message call will be made and the same processing of the message will occur as if the new API had not been called at all. This is done at decision steps 66, 70, and 72. Whether or not the function was supported will be transparent to the application, except in the perceived performance improvement of the main user interface thread when the support is there and the PM therefore does not raise the background thread's priority.

By using the described architecture, an application can invoke code called by its windows' message procedure without incurring the performance penalties caused by PM raising the CPU priority of the background thread doing the work when a message is sent. By using a macro to redefine the send message call to instead call the new API, the application code that previously sent the message would not need to be modified to receive the performance gains. With minimal code impact, a multi-threaded application can change its interface with its window such that its background thread processing does not impact the performance of its main user interface thread as perceived by the user. This can noticeably increase the usability of the application.

It is also possible for the operating system itself, or a stand-alone application, to provide the same level of support as described above. In order for this to occur, there would first need to be a registration process for an application to register its assorted window classes, the messages that they support, and the function that should be called for each supported message for each supported class. If this new support is provided by the operating system, this would be a new system-level API. If using a stand-alone application, the application desiring this support would have to add a call to the start of the application and therefore have available a similar API to call. This new API would be passed a pointer to the same two-dimensional array that the application previously set up in its own memory, as described above. Each of the functions referenced in the array by their function address would also have to be exported by the application so that they can be called from outside the application. In an OS/2 application, this is done by listing the exported function names in the export section of the definitions (.DEF) file.

Figure 5A:
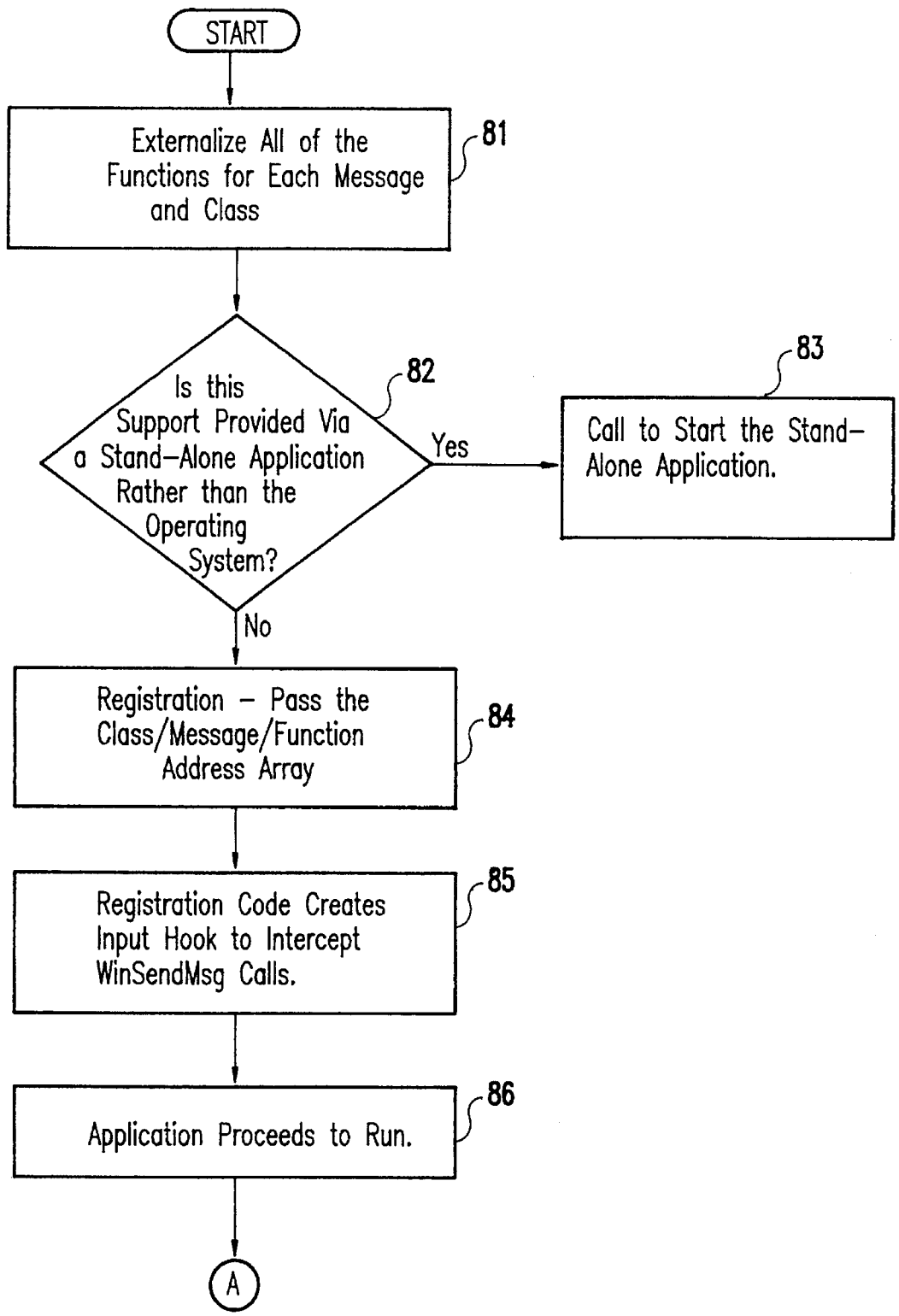
FIGS. 5A and 5B, taken together, are a flow diagram of the process of a second embodiment of the present invention.

This process is shown in FIG. 5A, to which reference is now made. The process begins by externalizing all of the functions for each message and class in function block 81. A test is then made in decision block 82 to determine if this support is being provided by a stand-alone application rather than the operating system. If so, a call to start the stand-alone application is made in function block 83. In either case, the next step in function block 84 is the beginning of the registration process. The class, message and function are first passed to the address array. Then, the registration code creates an input hook to intercept WinSendMsg calls in function block 85. At this point, the application proceeds to run, as indicated by function block 86.

Once the registration is accomplished, the application would no longer have to provide the algorithm to intercept the WinSendMsg call, parse the message and class to find the proper function address to call, and call the function. Instead, the operating system or the new stand-alone application will intercept the WinSendMsg call and perform the parsing of the call to find and call the proper function.

Figure 5B:
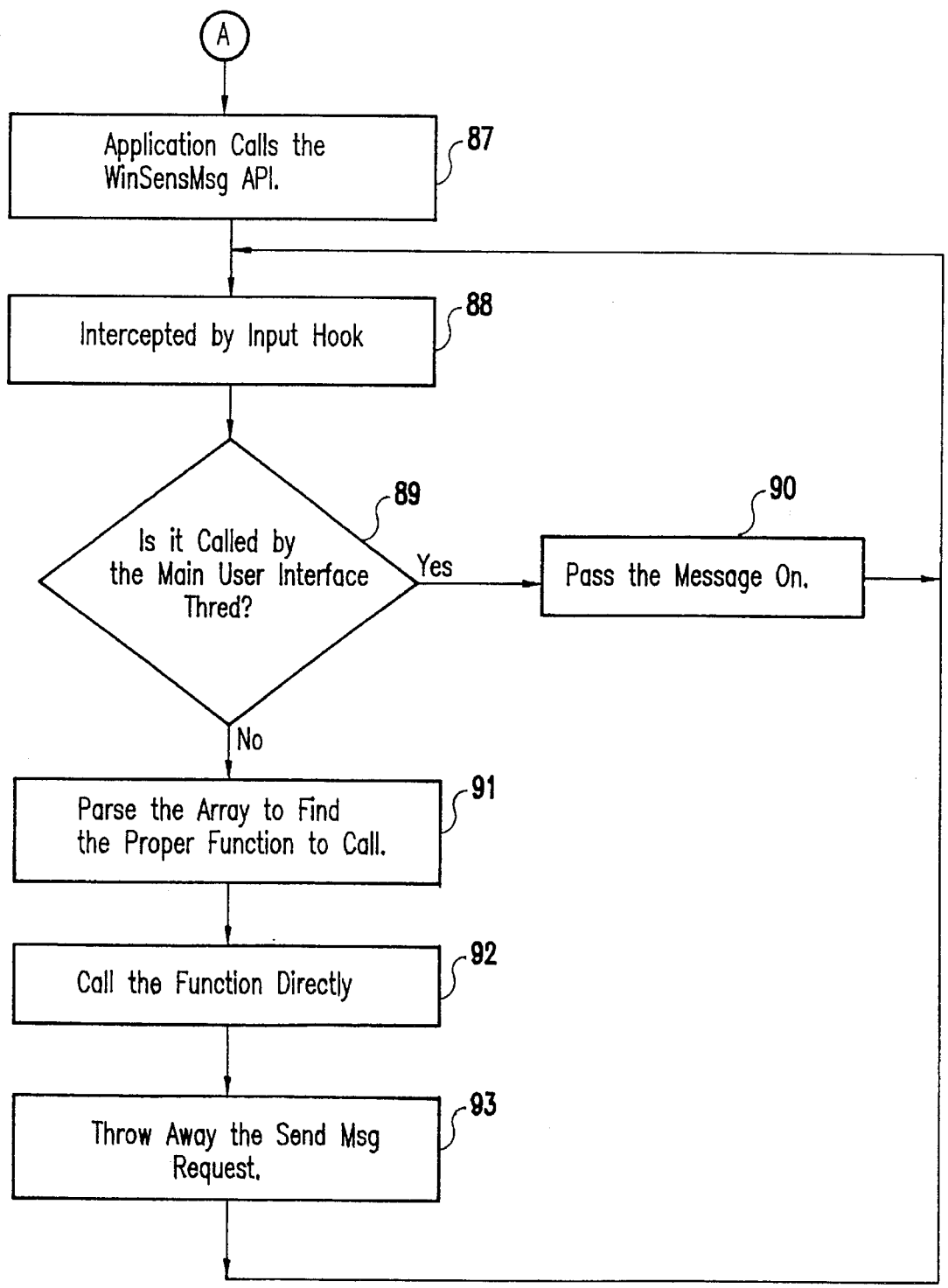

The process continues in FIG. 5B where, in function block 87, the application calls the WinSendMsg API. The WinSendMsg call is intercepted in function block 88 by the input hook created in function block 85 of FIG. 5A. With the hook created, all messages sent by the application will be intercepted. The hook will check whether the message was sent on the primary thread or from a secondary background thread in decision block 89. If the primary user-interface thread, then the message would be passed on to the window as if the hook did not exist, as indicated in function block 90, before the process returns to function block 88. If on a secondary thread, however, the algorithm to parse the proper function address out of the array is invoked in function block 91, and the function directly called in function block 92 instead of being processed via a message. Finally, the send message request is thrown away in function block 93 before a return is made to function block 88.

This alternative embodiment of the invention allows the capability of providing the invention support via the operating system or via a stand-alone application, so that other applications could receive the support when interfacing with their windows from background threads, without the other applications having to re-implement the invention in their internal code.

While the invention has been described in terms of IBM's OS/2 and its Presentation Manager (PM) windowing system, those skilled in the art will recognize that the invention may be applied to other windowing operating systems. While the primary focus of the description of the invention is specifically directed to converting a message-driven application to an API-driven application that retains the same functionality in a windowing graphical user interface, the invention has broader utility. For example, the invention can be useful in helping to port an existing message-driven application to an operating system that is procedural, non-message-driven application. By using the invention in the message-driven application, all of the message handling window procedures can be used as is for application-generated messages because the messaging interface is already being simulated by the invention. Instead of using it only for background threads, it can be used for all threads. Thus, it will be understood that the invention can be practiced with modification within the spirit and scope of the appended claims.

Having thus described our invention, what we claim as new and desire to secure by Letters Patent is as follows:

1. A method for an application program to avoid using a messaging interface to a windowing operating system comprising the steps of:

converting a message-driven application program to an application programming interface driven application by inserting code in the application program such that the inserted code intercepts a send message call to the windowing operating system; and when a thread of the application program having a low priority sends a message to the windowing operating system, intercepting and converting the message to an application programming interface function call and returning the converted message to the application program so that the operating system never sees the message sent by the thread of the application program and the low priority of the thread is maintained.

2. The method recited in claim 1 further comprising the steps of:

declaring a two-dimensional array, a first dimension of which is for message numbers supported by the application programming interface and a second dimension of which is for class names of windows that are supported; and accessing the two-dimensional array when a message is sent to the operating system to determine if the message is supported.

3. The method recited in claim 2 wherein if the message is not supported, then processing the message by the operating system.

4. A method for porting an existing message-driven application program to a procedural operating system comprising the steps of:

converting a message-driven application program to an application programming interface driven application by inserting code in the application program such that the code intercepts a send message call to the procedural operating system; and when the application program sends a message to the operating system, intercepting and converting the message to an application programming interface function call and returning the converted message to the application program so that the procedural operating system never sees the message sent by the application program thereby simulating the messaging interface of the operating system.

5. A computer program product having a computer readable medium having computer program logic recorded thereon for a message-driven application program to avoid using a messaging interface to a windowing operating system, the computer program product comprising:

conversion means for converting the message-driven application program to an application programming interface driven application, said conversion means including code inserted in the application program such that the code intercepts a send message call to the windowing operating system;

means for intercepting and converting the message to an application programming interface function call when a thread of the application program having a low priority sends a message to the windowing operating system; and means for returning the converted message to the application program so that the windowing operating system never sees the message sent by the thread of the application program and the low priority of the thread is maintained.

6. An computer system comprising:

a windowing operating system on which a message-driven application program is run;

means for converting the message-driven application program to an application programming interface driven application by inserting code in the application program such that the code intercepts a send message call to the windowing operating system;

means for intercepting and converting the message to an application programming interface function call when a thread of the application program having a low priority sends a message to the windowing operating system; and means for returning the converted message to the application program so that the windowing operating system never sees the message sent by the thread of the application program and the low priority of the thread is maintained.

7. The computer system recited in claim 6 further comprising:

a two-dimensional array, a first dimension of which is for message numbers supported by the application programming interface and a second dimension of which is for class names of windows that are supported; and means for accessing the two-dimensional array when a message is sent to the operating system to determine if the message is supported.

8. The computer system recited in claim 7 wherein if the message is not supported, then said windowing operating system processing the message.

9. A method for avoiding using a messaging interface to a windowing operating system by an application program comprising the steps of:

registering by the application program its window classes, messages that its window classes support, and functions that should be called for each supported message for each supported class, said step of registering including creating an input hook to intercept window message calls;

when a thread of the application program having a low priority sends a message to the windowing operating system, intercepting the message using the input hook and converting the message by parsing an array to find a function corresponding to the message to call and calling the function directly without processing the message.

* * * * *

UNITED STATES PATENT AND TRADEMARK OFFICE
CERTIFICATE OF CORRECTION

PATENT NO. : 5,623,663
DATED : 4/22/97
INVENTOR(S) : S. A. Morgan, et al.

It is certified that error appears in the above-identified patent and that said Letters Patent is hereby corrected as shown below:

Col. 6, line 60, after "the", second occurrence, insert --windowing--.

Signed and Sealed this

Ninth Day of June, 1998

Attest:

BRUCE LEHMAN

*Attesting Officer*  *Commissioner of Patents and Trademarks*